UNITED STATES PATENT OFFICE.

GEORG KALISCHER, OF MAINKUR, NEAR FRANKFORT-ON-THE-MAIN, AND DETLEV NISSEN, OF FRANKFORT-ON-THE-MAIN, GERMANY, ASSIGNORS TO CASSELLA COLOR COMPANY, A CORPORATION OF NEW YORK.

VAT DYES AND PROCESS OF MAKING SAME.

1,129,575.  Specification of Letters Patent.  Patented Feb. 23, 1915.

No Drawing.  Application filed June 18, 1914.  Serial No. 845,837.

*To all whom it may concern:*

Be it known that we, GEORG KALISCHER, Ph. D., a subject of the King of Prussia, residing at Waldstrasse 23, Mainkur, near Frankfort-on-the-Main, and DETLEV NISSEN, Ph. D., a subject of the King of Prussia, residing at Habsburger Allee 63, Frankfort-on-the-Main, Germany, have invented certain new and useful Improvements in Vat Dyes and Processes of Making Same, of which the following is a full description.

This application relates to the manufacture and production of a specific new vat dyestuff, while in another application we describe the whole class to which this specific dyestuff belongs.

The process for the production of the new vat dyestuff consists in heating 1.amino.2.-methylanthraquinone with sulfur to an elevated temperature in the presence of benzidin. The quantity may be varied considerably. The use of about 1 molecule benzidin to 2 molecules of 1.amino.2.methylanthraquinone yields especially good results. The new vat dyestuff dyes cotton claret shades fast to washing, chlorin and light.

The process of working is illustrated by the following example:

Example: A mixture of 20 kilos 1.amino.-2.methylanthraquinone, 9 kilos benzidin, 70 kilos sulfur is heated for four hours to 210–220° C., the temperature of the melt being then kept for another four hours at 240° C. After cooling down the melt is powdered and any excess of sulfur is removed by treating with a hot solution of sodium sulfid. The resulting dyestuff is a dark powder when dried, soluble in concentrated sulfuric acid with a brown color which turns to bluish green on the addition of paraformaldehyde. With hydrosulfite and caustic soda lye a dark-red vat is formed which dyes cotton claret shades.

Having now particularly described and ascertained the nature of our said invention, and in what manner the same is to be performed, we declare that what we claim is:

1. The process of producing a new vat dyestuff which consists in heating 1.amino.2.-methylanthraquinone with sulfur in the presence of benzidin, the dyestuff thus obtained being a dark powder soluble in concentrated sulfuric acid with a brownish color which on the addition of paraformaldehyde is changed into bluish green, yielding a dark-red vat with hydrosulfite and caustic lye which dyes cotton claret shades substantially as described.

2. The herein described new vat dyestuff obtained by heating 1.amino.2.methylanthraquinone with sulfur in the presence of benzidin, the said dyestuff being a dark powder soluble in concentrated sulfuric acid with a brown color which on addition of paraformaldehyde is changed into bluish green, yielding a dark red vat with hydrosulfite and caustic soda lye which dyes cotton claret shades, substantially as described.

In witness whereof we have hereunto signed our names this 4th day of June 1914, in the presence of two subscribing witnesses.

DR. GEORG KALISCHER.
DR. DETLEV NISSEN.

Witnesses:
JEAN GRUND,
CARL GRUND.

Copies of this patent may be obtained for five cents each, by addressing the "Commissioner of Patents, Washington, D. C."